Patented Aug. 25, 1925.

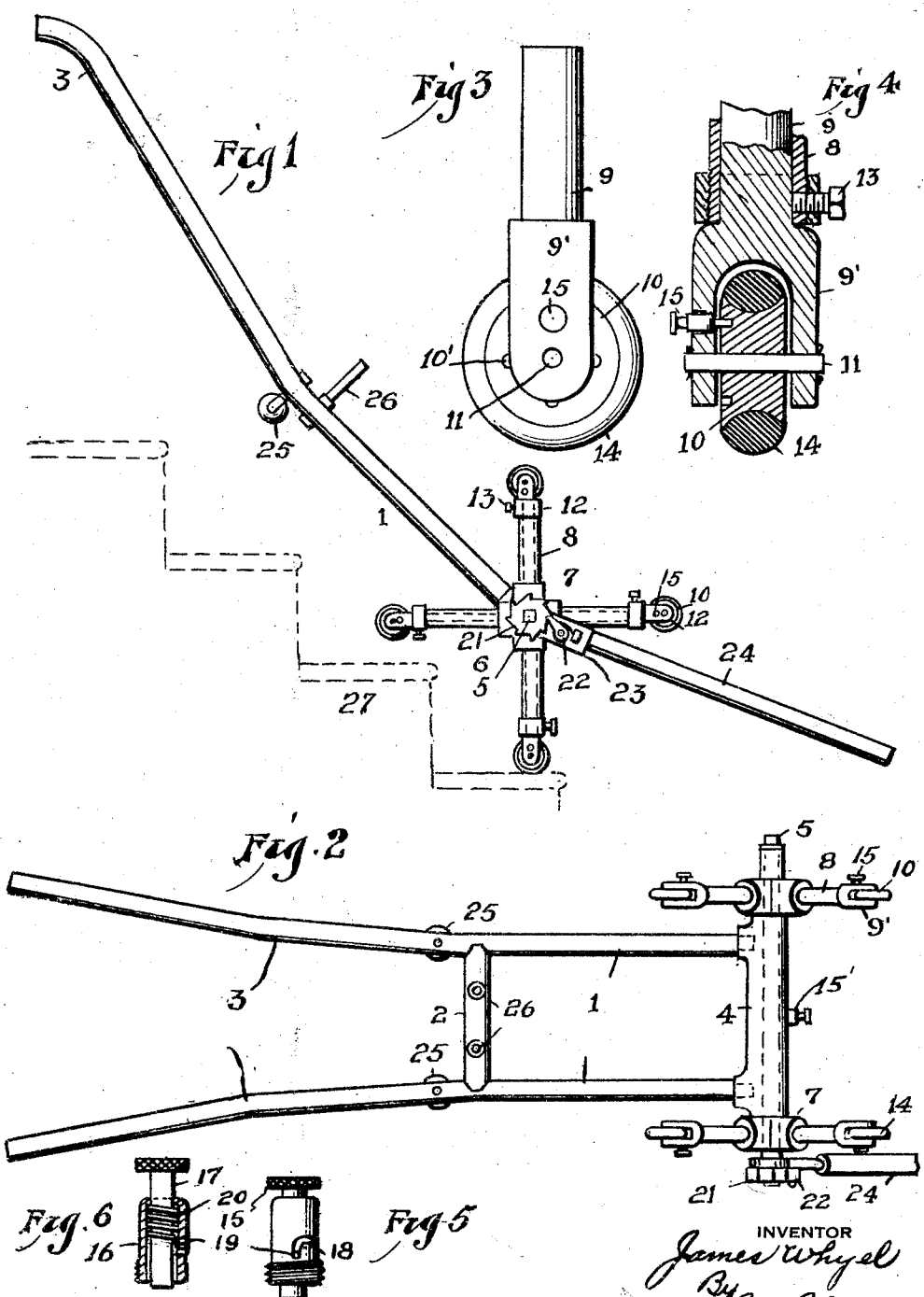

1,551,127

UNITED STATES PATENT OFFICE.

JAMES WHYEL, OF BRENTWOOD, PENNSYLVANIA.

HAND TRUCK.

Application filed January 26, 1924. Serial No. 688,810.

*To all whom it may concern:*

Be it known that I, JAMES WHYEL, a citizen of the United States, residing at Brentwood, in the county of Allegheny and State of Pennsylvania, have invented certain new and useful Improvements in Hand Trucks, of which the following is a specification.

This invention relates broadly to hand trucks, but particularly to a hand truck designed for conveying heavy objects namely, radiators, safes, pianos, etc., up or down a stairway, and while primarily adapted for such use, it is to be understood that the device may be employed for any purposes wherein it is found to be applicable.

Important objects of this invention are to provide a hand truck of the type stated, in a manner as hereinafter set forth which will facilitate the handling of heavy objects up or down a stairway, which embodies a pair of novel tread elements, capable of adjustment to accommodate them to stairway risers of various heights and to stairway treads of various widths, which provides novel means for operating the tread elements and which may be utilized as a hand truck of the ordinary construction and in the usual manner.

Further objects of the invention are to provide a device of the class specified which is simple in its construction and arrangement, strong, durable and efficient in its use, and comparatively inexpensive to manufacture.

With the foregoing and other objects in view, which will appear as the description proceeds, the invention resides in the details of construction hereinafter described and claimed, it being understood that changes in the precise embodiment of the invention herein disclosed can be made within the scope of the claims hereunto appended without departing from the spirit of the invention.

Figure 1 is a side view of a hand truck, in accordance with my invention, illustrating its adaptation to a stairway, the latter being shown in dash lines.

Figure 2 is a top plan view of the device.

Figure 3 is a vertical side view of a caster and the supporting leg section therefor.

Figure 4 is a cross sectional view of the caster and associated parts.

Figure 5 is a vertical view of the caster locking element.

Figure 6 is a similar view partly in cross section.

Referring in detail to the drawing, 1 denotes a strong frame braced by a cross-bar 2. One end of the frame 1 is open and the side bars of the frame at each end are suitably formed to provide a pair of handles 3. The other or closed end of the frame 1 is formed by a fixed horizontally disposed bearing member 4.

A shaft 5 is rotatably mounted in the bearing member 4. A tread element 6 is fixedly mounted on each end of the shaft 5 to rotate therewith. Each of the tread elements 6 consists of a cruciform shaped hub 7, having each arm thereof permanently connected to a radially disposed tubular leg 8. The hub 7, being of cruciform shape provided for the connecting therewith of four radially disposed tubular legs 8, each of which is disposed at right angles with respect to adjacent legs 8. The tread elements 6 on respective ends of the shaft 5, are so secured to the latter exteriorly of the member 4, that all parts of one of the tread elements are disposed in parallel relatively to corresponding parts of the other of the tread elements.

A shiftable leg extension 9 is adjustably mounted in each of the tubular legs 8, and which is formed with a yoke-shaped outer terminal 9' positioned exteriorily of the outer end of the leg 8. Carried by the outer terminal 9' of each leg extension is a shaft 11 upon which is mounted a caster 10. The outer end of each of the tubular legs 8 is re-inforced by a collar 12 which carries an adjustment screw 13 for locking the shiftable leg extension 9 in the adjusted position in the associated tubular leg 8. The adjustment of the leg extension 9 accommodates the device to variations in sizes of different stairways.

Each of the casters 10 is preferably provided with a rubber tire 14 to prevent noise and liability of marring the surface over which they travel.

Each of the yoke shaped outer terminals 9' is provided with a spring controlled locking element 15 capable of locking the casters against rotation when desired. Each of the locking elements 15 consists of a cylindrical casing 16 in which a locking bolt 17 is shiftably mounted. The casing 16 is mounted in a threaded aperture provided therefor in the yoke end 9' of each of the leg extensions 9. The casing 16 is formed with an L-shaped slot 18 into which projects the pin 19 fixed on the bolt 17. A spiral spring 20 is mounted on the bolt 17 intermediate of the pin 19 and the top of the casing 16, as clearly shown in Figure 6, of the drawing.

One side of each of the casters 10 is provided with a circular row of sockets 10', having a radial disposition to bring them into registration with the inner end of the bolt 17 of the locking element 15. By releasing the pin 19 from the circumferential portion of the slot 18 the spring 20 will force the bolt 17 into the registering socket 20' and lock the casters against rotation. By withdrawing the bolt 17 and again positioning the pin 19 in the circumferential portion of the slot 18 the casters 10 will be released for rotation.

A similarly constructed but heavier locking element 15' is mounted on the bearing member 4 and is adapted to engage and lock the shaft 5 against rotation when desired for the purpose to be described.

A ratchet wheel 21 is fixed to one end of the shaft 5 and is adapted to be engaged by a spring controlled panel 22 pivotally carried on the ratchet lever 23, which latter is pivoted to the shaft 5 at one end, and includes a detachable handle 24, to facilitate the operation of the ratchet mechanism. The arrangement of latter is such as to automatically function to assist rotation of the shaft 5 in the counter clockwise direction.

The frame 1 is provided with a pair of depending short rubber tipped supports 25, to eliminate liability of marring surfaces contacting therewith.

A pair of vertically extending uprights 26 are fixed in the cross bar 2 and are adapted for engaging the object mounted thereon and secure the same against movement during the transportation process. However, any other suitable securing means for the object being transported, to best meet conditions may be employed.

When my improved device is used as an ordinary hand truck the shaft 5 is first locked against rotation by the adjustment of the locking element 15' on the bearing member 4. When the shaft 5 is in the locked position one pair of the legs of each of the tread elements 6 will extend in the horizontal direction and the other pair will extend in the vertical direction. By releasing the casters 10 for rotation on the depending legs of the vertically disposed pair of legs, the truck may be pulled, pushed or rolled about on the released casters in the usual manner. When using the truck for conveying objects up a stairway the shaft 5 is released to permit of its rotation and all of the casters 10 are preferably, though not essentially locked against rotation.

The operation of the loaded truck on a stairway requires two persons, one of whom manipulates the lever 23 while the other manipulates the handles 3 of the frame 1. As the legs of each of the tread elements 6 are disposed at right angles with respect to each other, they will successively engage consecutive treads of the stairway 27 during the operation of the device.

The lever 23 is operated by a pumping action of the operator, the downward strokes being idle when ascending a stairway, as the pawl 22 does not engage the ratchet wheel 20 on the downward movement of the lever 23. On the upward movement of the lever 23 the pawl 22 will engage the ratchet wheel 20, thereby revolving the shaft 5 and lifting the tread elements from one tread of the stairway to the one adjacent thereto, as clearly illustrated in Figure 1, of the drawing.

In descending a stairway the lever 23 is used by the operator to provide proper retardation of the truck and load. It is necessary to manually release the pawl 22 from the ratchet wheel 20 when elevating the lever 23 during the descending operation.

What I claim is:

1. A stair truck comprising a rectangular frame having an open and a closed end, the sides of the frame at the open end formed to provide a pair of handles, a shaft extending through the closed end of the frame, a cruciform-shaped hub fixed to each end of said shaft, a series of tubular legs secured to each hub, a leg extension adjustably mounted in each of said legs and having a yoke-shaped outer terminal permanently arranged exteriorly of the outer end of a leg, a caster revolubly mounted in each of said terminals and formed with a series of sockets, a normally inactive spring controlled locking device releasably carried by each terminal and selectively engaging in one of the sockets of a caster when active to lock the caster from rotation, and means carried by the legs for locking the extension in adjusted position.

2. A stair truck comprising a rectangular frame having an open and a closed end, the sides of the frame at the open end formed to provide a pair of handles, a shaft extending through the closed end of the frame, a cruciform shaped hub fixed to each end of said shaft, a series of tubular legs secured to each hub, a leg extension adjustably mounted in each of said legs and having a yoke-shaped outer terminal permanently arranged exteriorly of the outer end of a leg, a caster revolubly mounted in each of said terminals and formed with a series of sockets, a normally inactive spring controlled locking device releasably carried by each terminal and selectively engaging in one of the sockets of a caster when active to lock the caster from rotation, means carried by the legs for locking the extension in the adjusted position and a lever and a pawl and ratchet mechanism mounted on one end of said shaft for intermittently revolving it.

3. A stair truck comprising a rectangular frame having an open and a closed end, the sides of the frame at the open end formed to provide a pair of handles, a shaft extending through the closed end of the frame, a cruciform shaped hub fixed to each end of said shaft, a series of tubular legs secured to each hub, a leg extension adjustably mounted in each of said legs and having a yoke-shaped outer terminal permanently arranged exteriorly of the outer end of a leg, a caster revolubly mounted in each of said terminals and formed with a series of sockets, a normally inactive spring controlled locking device releasably carried by each terminal when active to lock the caster from rotation, means carried by the legs for locking the extension in the adjusted position and a lever and a pawl and ratchet mechanism mounted on one end of said shaft for intermittently revolving it and a locking device carried by the closed end of said frame for locking the shaft to prevent the revolving thereof in either direction.

In testimony whereof I affix my signature.

JAMES WHYEL.